(12) United States Patent
Gougnaud

(10) Patent No.: US 8,863,570 B2
(45) Date of Patent: Oct. 21, 2014

(54) SUPPORT AND INSERT FOR ATTACHING A MODULE TO A TIRE WALL

(75) Inventor: Patrick Gougnaud, Saint Vincent (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 494 days.

(21) Appl. No.: 13/143,792

(22) PCT Filed: Jan. 8, 2010

(86) PCT No.: PCT/EP2010/050154
§ 371 (c)(1),
(2), (4) Date: Sep. 12, 2011

(87) PCT Pub. No.: WO2010/079215
PCT Pub. Date: Jul. 15, 2010

(65) Prior Publication Data
US 2011/0315292 A1 Dec. 29, 2011

(30) Foreign Application Priority Data
Jan. 9, 2009 (FR) .................................... 09 50101

(51) Int. Cl.
*G01M 17/02* (2006.01)
*B60C 23/04* (2006.01)
*B29D 30/00* (2006.01)

(52) U.S. Cl.
CPC ..... *B60C 23/0493* (2013.01); *B29D 2030/0072* (2013.01)

USPC .......................................................... 73/146

(58) Field of Classification Search
USPC ................................................ 73/146–146.8
See application file for complete search history.

(56) References Cited

U.S. PATENT DOCUMENTS

| 4,851,809 | A | | 7/1989 | McAlister | 340/442 |
| 5,139,840 | A | * | 8/1992 | Ferrara | 428/78 |
| 5,749,984 | A | * | 5/1998 | Frey et al. | 152/415 |
| 6,255,940 | B1 | | 7/2001 | Phelan et al. | 340/447 |
| 6,462,650 | B1 | * | 10/2002 | Balzer et al. | 340/442 |
| 6,782,741 | B2 | * | 8/2004 | Imbert | 73/146.5 |

(Continued)

FOREIGN PATENT DOCUMENTS

| DE | 10 2005 027 998 A1 | 12/2006 |
| EP | 1 598 218 A1 | 11/2005 |

(Continued)

*Primary Examiner* — Andre Allen
(74) *Attorney, Agent, or Firm* — Fitzpatrick, Cella, Harper & Scinto

(57) ABSTRACT

An attachment support, which is designed for attaching a module to a wall (101) of a tyre (100), includes a substantially flexible body (11) of substantially elongate shape. The body (11) includes a connecting surface (26) capable of being placed substantially permanently against an internal wall (101) of the tyre (100), a second, free surface (28) opposite to the connecting surface (26), and at least one substantially cylindrical housing (20). The housing (20) has an axis at right angles to the second, free surface (28) of the body (11) and is open on the second, free surface (28). The housing (20) includes a first substantially cylindrical portion (22) extended by a chamber (21) of substantially cylindrical shape and coaxial with the first portion (22). The chamber (21) has a diameter greater than the diameter of the first portion (22) of the housing (20).

5 Claims, 5 Drawing Sheets

(56) References Cited

U.S. PATENT DOCUMENTS

| | | | |
|---|---|---|---|
| 6,885,291 B1 * | 4/2005 | Pollack et al. | 340/445 |
| 7,009,506 B2 | 3/2006 | Wilson et al. | 340/445 |
| 7,107,830 B1 * | 9/2006 | Yu et al. | 73/146.4 |
| 7,493,807 B2 | 2/2009 | Demaie et al. | 73/146.5 |
| 2002/0174925 A1 | 11/2002 | Wilson et al. | 152/415 |
| 2004/0112489 A1 | 6/2004 | Imbert | 152/151 |
| 2004/0118196 A1 | 6/2004 | Landes et al. | 73/146 |
| 2005/0126704 A1 * | 6/2005 | Wacker | 156/307.7 |
| 2006/0201241 A1 * | 9/2006 | Durif | 73/146 |
| 2009/0145216 A1 * | 6/2009 | Huang et al. | 73/146.5 |
| 2009/0159169 A1 * | 6/2009 | Durif et al. | 152/367 |
| 2010/0276043 A1 | 11/2010 | Battocchio et al. | 152/151 |
| 2012/0112898 A1 * | 5/2012 | Yu et al. | 340/442 |
| 2012/0298487 A1 * | 11/2012 | MacLachlan et al. | 198/779 |
| 2013/0227912 A1 * | 9/2013 | May et al. | 53/64 |
| 2014/0007683 A1 * | 1/2014 | Guinart et al. | 73/514.02 |

FOREIGN PATENT DOCUMENTS

| | | |
|---|---|---|
| WO | WO 01/36220 A1 | 5/2001 |
| WO | WO 02/081238 A1 | 10/2002 |
| WO | WO 2009/056741 A2 | 5/2009 |

* cited by examiner

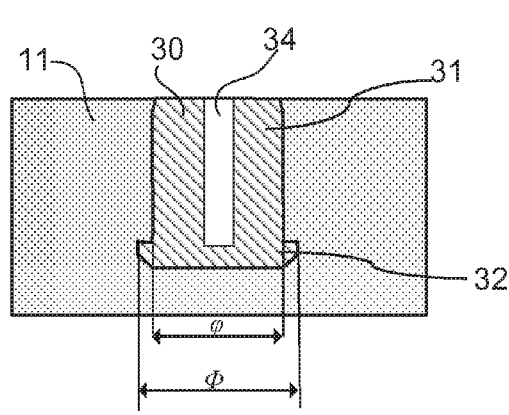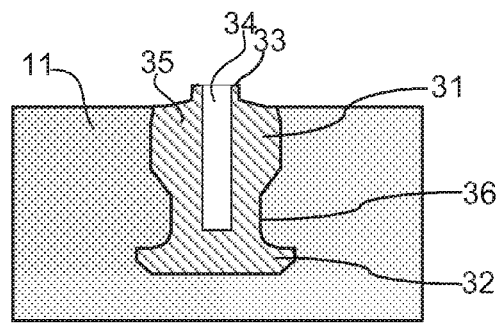
Fig. 3  Fig. 4
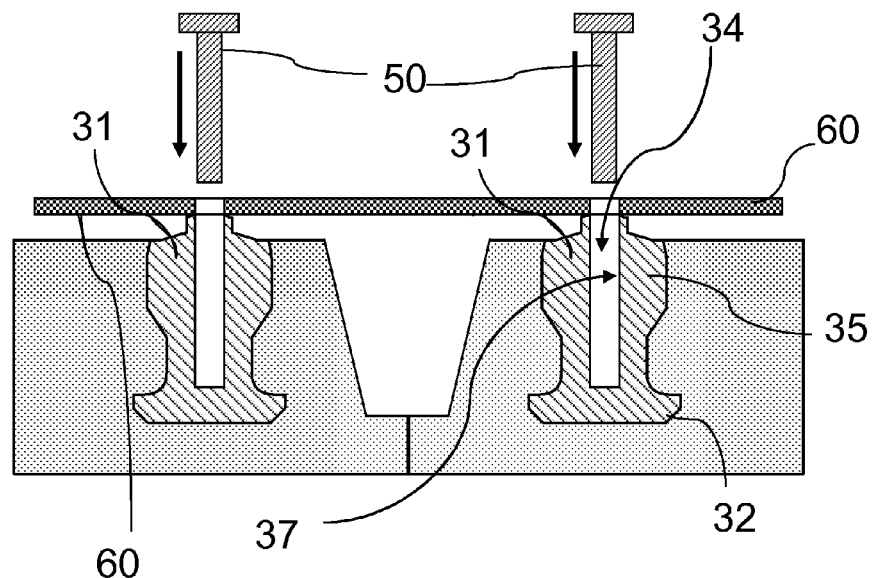
Fig. 5

SUPPORT AND INSERT FOR ATTACHING A MODULE TO A TIRE WALL

FIELD OF THE INVENTION

The invention relates to the attachment of a module, particularly an electronic module, such as a pressure sensor, to a tyre wall. More precisely it relates to a support and an insert for the attachment of such a module. It also relates to a tyre fitted with such an attachment support.

TECHNOLOGICAL BACKGROUND

For safety purposes, an increasing number of motor vehicles have monitoring systems comprising electronic modules and/or sensors mounted on each of the wheels of the vehicle, dedicated to measuring parameters such as pressure or temperature of the tyres of the wheels and designed to inform the driver of any abnormal change in the measured parameter.

When an electronic device is used, it is preferable not to attach it directly to the tyre because that might disrupt the mechanical behaviour of the tyre when running, particularly when it deforms. Moreover it might mechanically stress the module too much and possibly damage it.

Document EP 1 385 710 describes a device for attaching an electronic monitoring module to a tyre. This device comprises a plurality of patches or supports made of a rubbery mixture provided with rigid inserts designed to receive a screw. The electronic monitoring module designed to be attached by screwing is provided with pierced side lugs through which the screws are placed. This device is complex, costly to produce and not very reliable, mainly because it is too rigidly attached.

Document U.S. Pat. No. 7,009,506 describes a system for attaching an electronic module comprising a patch presented according to various embodiments allowing removable attachments. According to one embodiment, the patch comprises a casing or insert provided with a spherical cavity that is partially open for the insertion of the module. Such a cavity imposes a very particular shape on the electronic module. Moreover, retention only by clamping may turn out to be insufficient in the event of great stress, as is often the case when running. According to another embodiment, the insert comprises a threaded internal portion. In these various embodiments, the electronic module is either entirely or to a very great degree retained in the insert. This requires an insert of large dimension. This gives rise mainly to a very high mechanical stress on the module which sustains all the stresses to which the patch is subjected. Because of the severe running conditions that tyres have to withstand, this type of attachment is too restrictive for the modules of recent technologies which aim to be light, compact and not subjected to mechanical stresses that are too great.

The main object of the invention is to propose a method of attachment that allows better endurance of the assembly to the surface of a tyre. A further object is to propose a method of attachment allowing the electronic module to be easily and quickly installed and removed either for maintenance or replacement.

BRIEF DESCRIPTION OF THE INVENTION

For this purpose, the subject of the invention is a support for attaching a module to a wall of a tyre, comprising a substantially flexible body of substantially elongate shape, the body comprising at least one connecting surface capable of being placed substantially permanently against a wall of a tyre, a second, free surface opposite to the connecting surface and at least one substantially cylindrical housing, with its axis at right angles to the second, free surface of the body and open on this second, free surface, characterized in that the housing comprises a first substantially cylindrical portion extended by a chamber of substantially cylindrical shape and coaxial with the first portion and having a diameter greater than the diameter of the first portion of the housing.

The essential feature of this attachment support is that it comprises at least one housing for attaching an insert designed to interact with an assembly element for attaching an electronic module. The insert has a geometry that is identical or similar to that of the studs designed to enhance tyre grip on snowy or icy surfaces. These studs are usually attached by being inserted into housings arranged for this purpose in the tread of the tyres. The shape of the housings and of the studs is adapted to provide an excellent durability over time of the studs in their housings.

The supports and the inserts of the present invention therefore have the advantage of being able to be very easily assembled by insertion with very ordinary tools and of providing an excellent durability over time of the electronic modules thus attached.

Moreover such an attachment support makes it possible to produce a very good decoupling of the stresses usually encountered between the tyre wall and the support, which are flexible, and the module, which is more rigid. It moreover allows the modules to be reused.

According to one advantageous embodiment, the attachment support consists mainly of rubbery materials and the connecting surface comprises an adhesive.

According to another advantageous feature, the support comprises a peripheral edge delimited by a top surface, the connecting surface, and a surface of a junction between the top surface and the connecting surface, which surfaces converge at the junction at an angle (a) of between 9 and 15 degrees, and more particularly between 10 and 12 degrees.

The angle of the borders or peripheral edges of the support is a sensitive parameter that should be taken into consideration so that the attachment of the support to the tyre is durable. Specifically, if this angle is less than 9 degrees, folds may appear on the borders of the support because it is difficult to flatten these peripheral edges correctly. This situation is called "scalloping". If this angle is greater than 15 degrees, the peripheral edges of the support are too rigid. It then creates excessive stresses on the tyre wall, which may cause cracks or detachments of the support when running.

The invention also relates to a tyre comprising a support as explained above.

In this tyre, the modulus of elongation at 10% of the rubbery mixture of the connecting surface of the support is preferably at most equal to the modulus of elongation at 10% of the portion of wall of the tyre to which the support is attached.

The support may also comprise a layer of connecting mixture placed on the connecting surface without overlapping at right angles to the peripheral edge of the support. In such a variant, after the support has been manufactured by moulding, followed by curing, a layer of uncured connecting mixture is then placed on the connecting surface in order to provide the connection between the surface of the tyre and the connecting surface of the support. The thickness of this layer of connecting mixture is of the order of 0.3 mm. The support and layer of connecting mixture assembly is then cut out for example with a die. The cut-out surface of the connecting mixture must be exactly in line with the cut-out surface of the edging of the support. This makes it possible, after assembly to the tyre surface, to avoid having a layer of connecting mixture that protrudes from the support. Such a protrusion could cause a reduction in the service life of the assembly by oxidation of the connecting mixture that protrudes. The presence of the edging increases the margin of tolerance of the operation for cutting out the support including the connecting mixture. The risk of biting into the inclined portion of the top surface becomes practically zero.

Another subject of the invention is an attachment insert interacting with the above support, comprising an elongate cylindrical body surmounted by an attachment head, of substantially cylindrical shape and with a diameter greater than the diameter of the cylindrical body, the insert being suitable for being mounted by insertion into a housing of the said support provided for this purpose.

The attachment insert advantageously comprises, at the opposite end from the attachment head, a cylindrical opening designed to interact with an assembly element for attaching a module, in particular an electronic module.

The assembly element may interact with the insert by screwing, clipping, bonding, force-fitting, magnetism or coupling.

According to an advantageous variant, the axial cylindrical opening is provided with an axial internal thread and the assembly element is a screw.

Preferably, the ratio between the external diameter of the attachment head $\Phi$ and the maximum external diameter of the cylindrical body of the insert $\phi$ is between 1.1 and 1.3.

The cylindrical body of the insert may also comprise a zone of lesser diameter adjacent to the attachment head.

A further subject of the invention is an assembly for attaching a module comprising an attachment support and an insert as described.

BRIEF DESCRIPTION OF THE DRAWINGS

The invention will be better understood on reading the following description given only as an example and referring to the appended drawings, in which:

FIG. 3 is a view similar to that of FIG. 2, with an insert placed in one of the housings of the support;

FIG. 4 is a view similar to that of FIG. 2, with a second embodiment of an insert placed in one of the housings of the support;

FIG. 5 shows a view in section of a larger portion of the support of FIG. 1, along the plane II-II of FIG. 1, with two inserts and an electronic module being assembled by screwing;

These figures illustrate embodiments of an electronic module-support assembly with attachment by screwing, but equally apply to the other claimed embodiments. They are given for purely illustrative purposes and are not limiting.

DESCRIPTION OF EMBODIMENTS

"Modulus of elasticity" of a gum or rubbery mixture means a secant modulus of extension at 10% of deformation and at ambient or specified temperature, the measurement is taken after a first accommodation cycle up to 10% of deformation:

$$E_{10} = \frac{F_{10}}{S \times \varepsilon_{10}} \text{ i.e. } E_{10} = \frac{F_{10}(1 + \varepsilon_{10})}{S_0 \times \varepsilon_{10}} \text{ and } E_{10} = \frac{F_{10} \times 1.1}{S \times 0.1}$$

in which $\varepsilon_{10}$ is equal to 0.1; where
$E_{10}$: secant modulus of extension at 10% of deformation;
$F_{10}$: extension force at 10% of extension; $S_0$: initial section of the test piece; S: section of the test piece at the extension deformation $\varepsilon$, in the case of rubbery material, it is known that:

$$S = \frac{S_0}{1 + \varepsilon};$$

and $\varepsilon_{10}$: extension deformation at 10%.

The figures illustrate examples of support and attachment inserts suitable for attaching electronic modules or other modules to the surface of tyres of all types and particularly aircraft tyres. The support 10 is designed to be fitted to a tyre 100 in order to attach an electronic module 60 to the inside of the cavity of the latter, more particularly against an internal wall 101 of the tyre. The attached module can be of various types, depending on the requirements and the planned type of use. As an example, it is possible to cite electronic modules such as: pressure sensor, temperature sensor, vibration sensor, etc., preferably all furnished with means for communicating with a centralized device provided on the vehicle.

Figure 1:
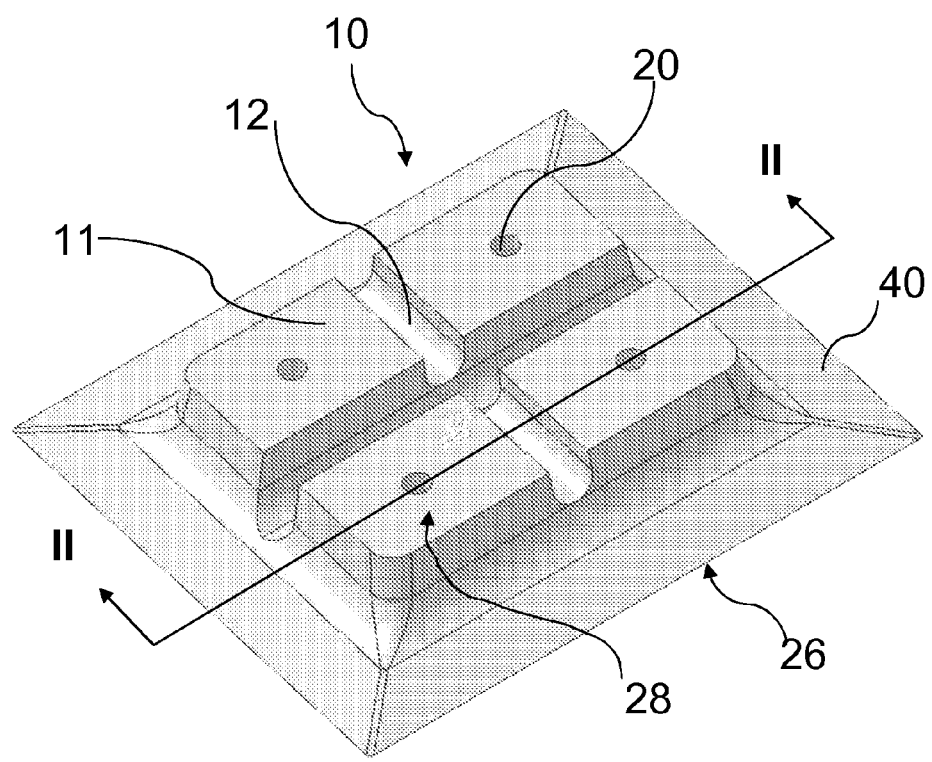
FIG. 1 is a view in perspective of a support according to an embodiment of the invention.

FIG. 1 shows a view in perspective of an attachment support 10 according to the invention. It comprises a body 11 that is substantially flat and elongate. Provided on a first face is a connecting surface 26 that is substantially flat and uniform, designed to interact with the internal wall of the tyre for an attachment that is preferably permanent. To make the assembly easier to place and attach, this surface can be provided with an adhesive suitable for rubbery materials. According to another embodiment, the surface may also be provided with a layer of connecting mixture 44, as described below. The body 11 also comprises a second, free surface 28, opposite to the surface 26.

The support 10 comprises at least one housing 20. In the example of FIG. 1, four housings 20 are provided so as to correctly distribute the retaining force for an electronic module of rectangular shape corresponding substantially to the periphery of the support. The number, arrangement, and spacing provided between the housings vary depending on the embodiments as a function of several parameters, such as the type and number of assembly elements 50 used, the surface area and the shape of the module to be attached, the type of use planned for the tyres (aircraft, passenger vehicle, agricultural vehicle or lorry, industrial vehicle, etc.), the intended period of attachment, etc.

The housings 20 are advantageously provided in portions of the body 11 in which the thickness is greater than the rest of the support 10. Between these portions, passageways 12 of reduced thickness make it possible to reduce the weight of the support 10 and to adjust the desired level of flexibility.

As illustrated in FIGS. 1, 7 and 8, 9 and 10, the support 10 comprises a peripheral edge 40 delimited by the line of junction 41 between the connecting surface 26 and a top surface 42. For manufacturing reasons and in particular to make aeration easier during moulding, it is possible for the line of junction 41 to be not of zero thickness but to be thin, of the order of 0.1 to 0.2 mm. In this case it is called the surface of junction 41. The two surfaces 26 and 42 converge on the line of junction 41 and between them, close to the line 41, form an angle alpha (a) of between 9 and 15 degrees and preferably between 10 and 12 degrees.

Preferably, the angle alpha (a) between the two surfaces 26 and 42 is between 10 and 12 degrees in a zone of the peripheral edge 40 extending to a distance d of approximately 7 mm from the line of junction 41.

Figure 8:
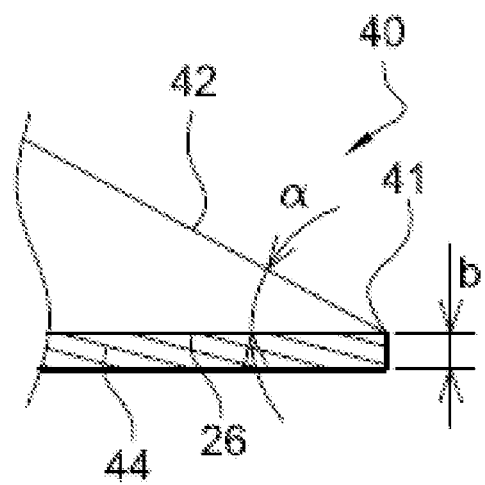
FIGS. 8, 9 and 10 are views in section of enlargements of three embodiments of a peripheral edge of a support with a layer of connecting gum.
Figure 9:
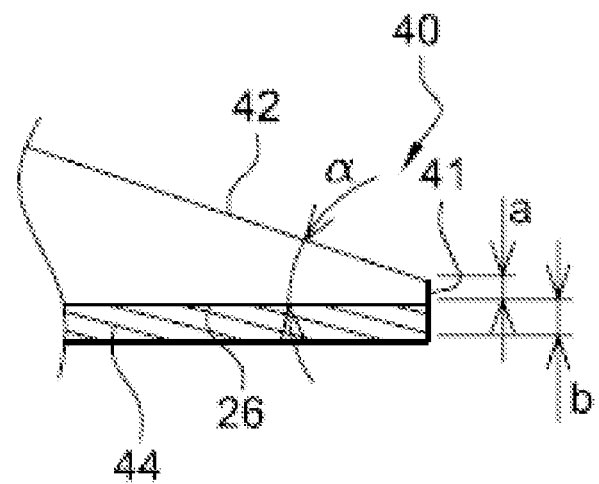
Figure 10:
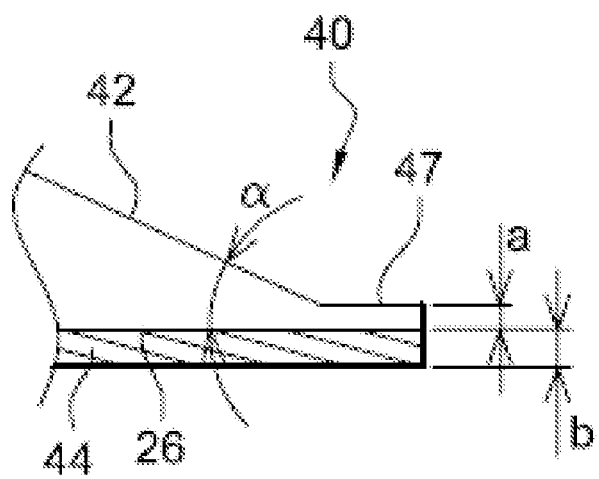

FIGS. 8, 9, and 10 show in section enlargements of three embodiments of the peripheral edge 40. In these three figures a layer of connecting mixture 44 is shown. In FIG. 8, the two surfaces 26 and 42 join together to form a line of junction 41, that is to say a surface of junction 41 of zero thickness.

In FIG. 9, the peripheral edge 40 is delimited by a surface of junction 41 at right angles to the surface 26 and with a thickness a of the order of 0.1 to 0.2 mm.

In FIG. 10, the peripheral edge 40 comprises an edging 47 that has a rectangular section and that extends over a distance of between 0 (as in FIG. 8) and approximately 1.5 mm. The presence of this edging 47 and of the surface of junction 41 make it easier to aerate the moulds for manufacturing the supports. It is also possible to use vents for example in other locations and retain a geometry as illustrated in FIG. 8.

Still in FIGS. 8, 9, and 10, note the presence of a layer 44 of connecting mixture, of thickness b of approximately 0.3 mm, placed against the connecting surface 26. This optional layer of connecting mixture ends at the peripheral edge without protruding from the edging or the surface or the line of junction.

Figure 2:
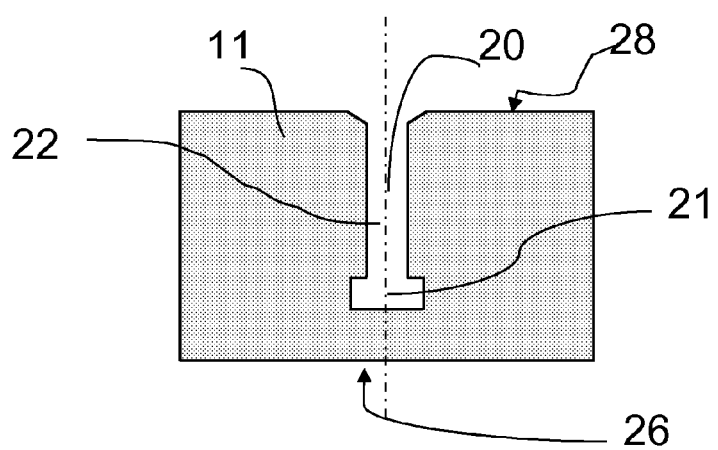
FIG. 2 is a view in section of a central portion of the support of FIG. 1 along the plane II-II of FIG. 1.

FIG. 2 shows a view in section of a portion of the attachment support of FIG. 1, in particular a portion in which a housing 20 is provided. According to this example, the housing 20 comprises an opening on the side opposite to the connecting surface 26 namely the side of the free surface 28. The housing 20 comprises a first substantially cylindrical portion 22 with an axis at right angles to the free surface 28 and which extends in the support 10 towards the connecting surface 26 via a chamber 21 of substantially cylindrical shape that is coaxial with the first portion 22 and has a diameter greater than the diameter of the first portion 22 of the housing 20.

This housing 20 is designed to receive an attachment insert 30, 35, as illustrated in FIGS. 3 and 4. The insert 30 comprises an elongate cylindrical body 31 surmounted by an attachment head or locking collar 32. The function of this attachment head 32 is to lock the insert 30 in position when it has been forced into a housing 20 of a support 10. The attachment head 32 has a diameter Φ greater than the diameter φ of the adjacent cylindrical body 31, in order to obtain this retention effect by clamping when the insert is in position in the corresponding housing of the support. The ratio Φ/φ is preferably between 1.1 and 1.3.

The cylindrical body 31 comprises a cylindrical bore 34 open on the side opposite to the attachment head 32. This bore 34 is designed to interact with an assembly element for the attachment of the electronic module.

The insert 30 can be made of the same materials as a grip stud such as a metal like steel or aluminium; it may also be made wholly or partly of plastic.

FIG. 4 shows a second embodiment of the insert 35. This insert 35 differs in two respects from the previous one 30. The substantially cylindrical body 31 comprises a thinner zone 36, with a smaller diameter than that of the rest of the cylindrical body 31, placed adjacent to the attachment head 32. This thinning enhances the effectiveness of the anchoring of the insert 35 in a housing 20. It also comprises a foot 33 placed on the side opposite to the attachment head and arranged as a thinner extension of the body 11. The body 11 of the support 10 and the insert 35 are configured so that the foot 33 protrudes from the body 11 in order to obtain a bearing surface for the electronic module 60, as illustrated in FIG. 5. This arrangement makes it possible to space the module 60 from the body 11 by at least 1 mm.

It should be noted that the same spacing between the electronic module and the free surface 28 of the support can be easily obtained by using an attachment insert as illustrated in FIG. 3. It is sufficient to add a washer of desired thickness between the head of the assembly element and the insert.

In the example of FIG. 5, the insert 35 has, as illustrated in FIG. 4, a non-constant diameter between the foot 33 and the head 32, but the portion adjacent to the head 32 has a diameter that is recessed relative to the head 32. The external diameter of the insert 35 and the internal diameter of the corresponding housing 20 are designed so as to obtain a tight fit. In this way a good hold is obtained despite the many mechanical stresses that the assembly must sustain. FIG. 4 shows a bottleneck portion 36, which provides an effective hold of the insert 35 despite the considerable axial forces which tend to expel the latter from the support 10 in use.

The inserts 30 and 35 are designed to interact with an assembly element 50, moreover interacting with the electronic module 60 that has to be attached. In this embodiment, as illustrated in FIG. 5, the assembly elements 50 are screws. The screws are provided so as to hold the module 60 resting against the feet 33 of the inserts 35: the screw head is resting on the outside of the module 60, the stem of the screw being held in the cylindrical opening 34 by an internal thread 37.

Figure 6:
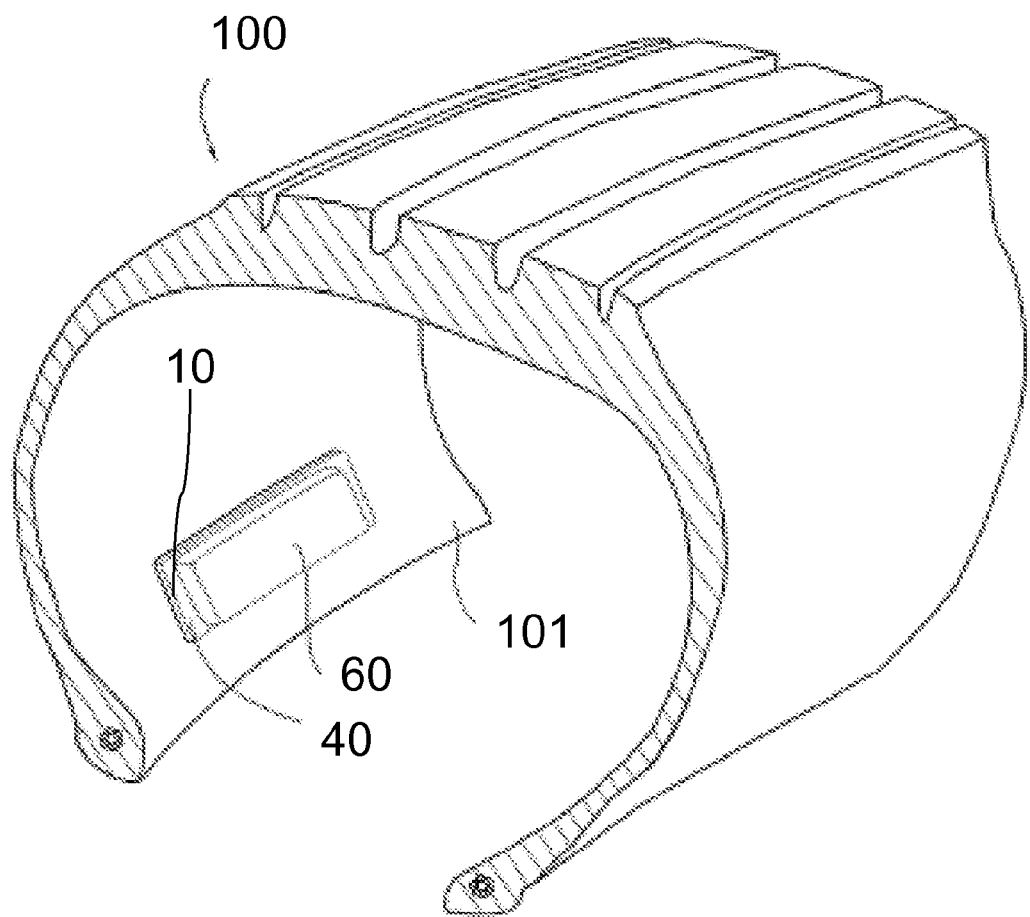
FIG. 6 illustrates an electronic module placed against a wall of a tyre by means of a support and an insert, according to aspects of the invention.
Figure 7:
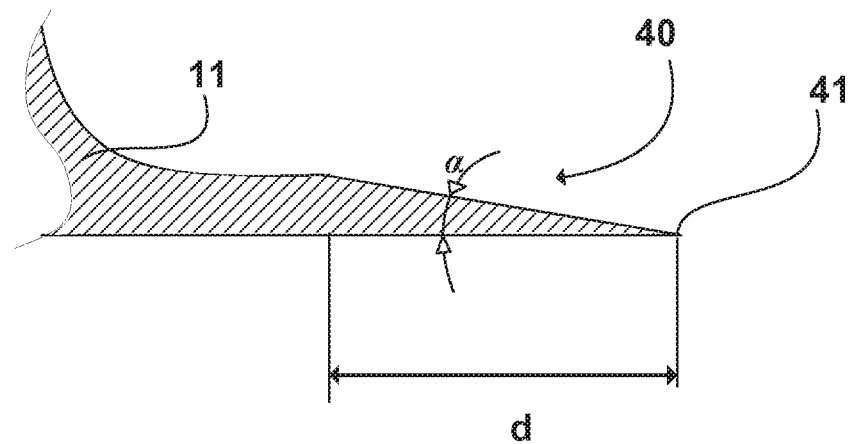
FIG. 7 shows a view in section of an enlargement of a first embodiment of a peripheral edge of a support.

FIG. 6 shows an electronic module attached to the internal wall 101 of a tyre 100 by means of a support and of inserts according to the invention. It shows the peripheral edge 40 of the support 10 to which the module 60 is attached. In this example, the assembly is positioned in the bottom portion of the sidewall of the tyre 100. This position, and the orientation of the assembly, may vary depending on the applications.

The supports 10 are preferably made of a single rubbery mixture. This makes them easier to produce. This mixture has a modulus of elongation at 10% at most equal to that of the tyre wall 101 against which the support 10 is intended to be attached. In other words, the support 10 is more flexible than the adjacent mixture of the tyre 100. As an example, for a modulus of elongation at 10% of the mixture inside the tyre 100 equal to 2.2 MPa at 65° C., the rubbery mixture of the support 10 will be chosen to be a mixture of which the modulus of elongation is at most equal to 2.2 MPa at 65° C. For good endurance of the assembly, the modulus of the mixture used should comply with this limit value throughout the temperature range of the tyre 100 when running, typically between 0 and 80 degrees Celsius. The mixture may be natural rubber-based and/or synthetic rubber-based.

It is naturally also possible for the supports 10 to consist of several layers of rubbery mixtures. In this case, the rubbery mixture of the connecting surface 26 has a modulus at most equal to that of the mixture of the tyre wall 101.

An aircraft tyre was fitted with an electronic module by means of a support with four housings as illustrated in FIG. 1 and of attachment inserts as illustrated in FIG. 4. The assembly elements were screws. This tyre underwent the usual homologation tests without the electronic module being torn off or damaged.

Finally, the invention is not limited to the examples previously described. It is possible, for example, to provide a plurality of geometries for the support and the inserts. Moreover, the number of inserts and of assembly elements may also vary depending on the embodiments, in particular as a function of the shape and dimensions of the electronic module.

The invention claimed is:

1. An attachment support for attaching a module to a wall of a tire, the attachment support comprising:
   a flexible body of an elongate shape, the body including:
      a connecting surface configured to be attached permanently against a wall of a tire by an adhesive layer, and
      a second, free surface opposite to the connecting surface; and
   at least one cylindrical housing disposed in the body, an axis of the housing being at right angles to the second, free surface of the body, wherein
   the housing is open on the second, free surface, and
   the housing includes a first portion that is cylindrical and is extended by a chamber of a cylindrical shape, the chamber being coaxial with the first portion and having a diameter greater than a diameter of the first portion.

2. The attachment support according to claim 1, wherein the body is formed of rubbery materials.

3. The attachment support according to claim 1, wherein the connecting surface includes an adhesive.

4. The attachment support according to claim 1, further comprising a peripheral edge attached to the body, the peripheral edge including a top surface connected to the connecting surface at a junction, wherein the top surface and the connecting surface form an angle ($\alpha$) at the junction, and wherein the angle ($\alpha$) is between 9 and 15 degrees.

5. The attachment support according to claim 1, further comprising a peripheral edge attached to the body, the peripheral edge including a top surface connected to the connecting surface at a junction, wherein the top surface and the connecting surface form an angle ($\alpha$) at the junction, and wherein the angle ($\alpha$) is between 10 and 12 degrees.

* * * * *